Patented Apr. 3, 1951

2,547,044

UNITED STATES PATENT OFFICE 2,547,044

PRODUCTION OF BENZANTHRONE VAT DYES METHYLATED IN 9-POSITION

David I. Randall, Phillipsburg, N. J., assignor to General Aniline & Film Corporation, New York, N. Y., a corporation of Delaware No Drawing. Application February 17, 1949, Serial No. 77,053

2 Claims. (Cl. 260—274)

The present invention relates to vat dyes of the benzanthrone series having a methyl group in the 9-position of the benzanthrone ring and capable of yielding dyeings upon printing which are of a full olive shade.

U. S. P. 995,936 describes the preparation of a dye known as Indanthrene Olive Green B by ring closing benzanthronyl-1-aminoanthraquinone in a melt of caustic potash. While this dye is rather interesting, it suffers from the disadvantage that it is a poor printer in that it is rather unstable in sulfuric acid solution. In addition, the intensities of its prints are weak and the shades thereof are too much on the greenish side.

It is proposed in U. S. P. 1,832,236 to obtain purer dyeings than can be obtained with Indanthrene Olive Green B by alkylating the nitrogen atom of the older dyestuff. It is indicated that the resulting product yields dyeings which are blue-green in color. These N-alkyl derivatives are even poorer printers than the older dye. Furthermore, prints produced from the N-alkyl derivative, like those of the Indanthrene Olive Green B, are of poor intensity and do not have satisfactory fastness properties.

It has now been discovered that benzanthrone dyes of the Indanthrene Olive Green B type containing a methyl group in the 9-position of the benzanthrone ring are capable of printing in full olive shades of good strength and excellent fastness properties. The new products, despite the fact that they are isomers of the compounds described in U. S. P. 1,832,236, are far superior from the standpoint of the intensity and shades of the prints obtained therewith and the stability of the dyes to sulfuric acid.

Vat dyes of the Indanthrene Olive Green B type containing a methyl group in the 9-position of the benzanthrone ring, the method of producing such dyes, and the di-sulfuric acid esters of the dyes constitute the purposes and objects of the present invention.

The vat dyes contemplated herein may be produced in several ways. One method involves the condensation of 9-chloromethyl-4-bromobenzanthrone with a 1-aminoanthraquinone followed by caustic fusion to the final dye. Rather peculiarly, under the conditions of the reaction, only the bromine atom in 4-position of the benzanthrone reacts with the aminoanthraquinone, the chlorine atom in the 9-methyl group being split off as hydrochloric acid.

Another method for producing the vat dyes involves the condensation of any primary aromatic amine, such as aniline, toluidine, 1-aminonaphthalene, 2-aminonaphthalene, and the like with 4-bromo-9-chloromethylbenzanthrone at a temperature below which the bromine in 4-position does not react, i. e., below 125° C. A 1-aminoanthraquinone is then reacted with the bromine in 4-position and the intermediate thus obtained ring closed by fusion in caustic alkali. During fusion the arylamino moiety is removed by reductive-cleavage.

The production of the vat dyes as above may be graphically illustrated as follows:

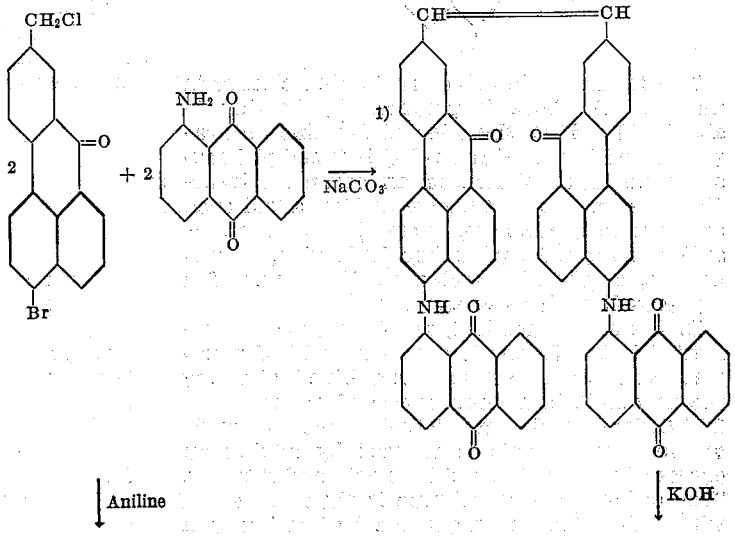

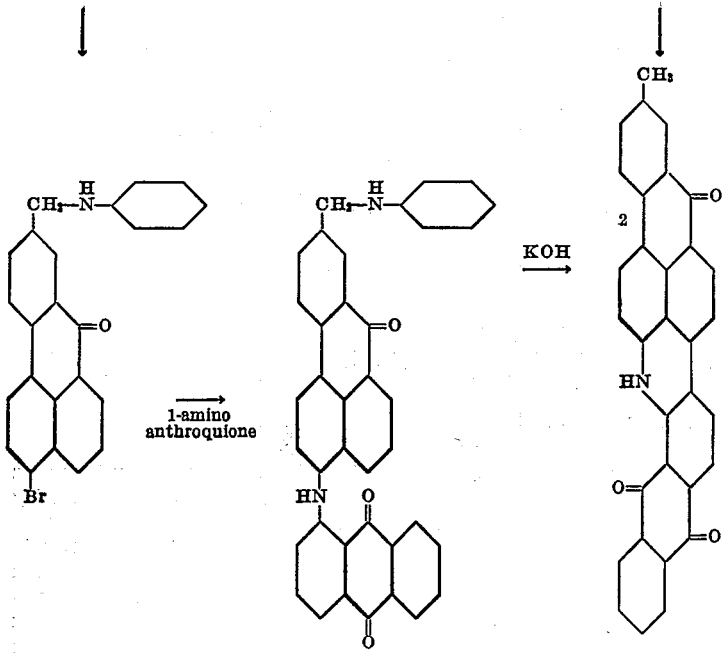

The dyes may also be obtained by condensing a 1-amino-anthraquinone with a quaternary ammonium salt of 4-bromo-9-chloromethyl benzanthrone followed by caustic fusion. The quaternary ammonium salt may be of any tertiary amine such as pyridine, dimethyl aniline, diethyl aniline, quinoline, morpholine, trimethylamine, triethylamine, tributylamine, and the like. The structure of the quaternary ammonium salt, assuming pyridine to be the tertiary amine, is as follows:

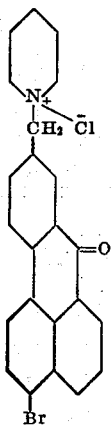

The intermediate subjected to ring closure in method (1) above is prepared by heating to about 180–225° C. the selected 1-amino-anthraquinone with the 4-bromo-9-chloromethyl benzanthrone in a solution of an organic solvent-diluent such as nitrobenzene and an alkali such as sodium carbonate, potassium carbonate, sodium hydroxide, potassium hydroxide, sodium acetate, or the like, and a small amount of a copper salt such as copper acetate.

In the second method, the 4-bromo-9-chloromethyl benzanthrone is condensed with the primary aromatic amine such as aniline by heating the reactants to a temperature of about 100 to 120° C. for several hours. The 4-bromo-9-phenyl-amino benzanthrone is isolated by adding an excess of aqueous hydrochloric acid and filtering. The arylamino benzanthrone is then condensed with a 1-amino-anthraquinone by heating in a reaction mixture of the type employed for condensing the 4-bromo-9-chloromethyl benzanthrone with a 1-amino-anthraquinone.

The quaternary ammonium compound employed in the third method may be prepared by heating 4-bromo-9-chloromethyl benzanthrone with the desired tertiary amine such as pyridine to a temperature ranging from about 80–125° C. Such quaternary ammonium compound is then condensed with the 1-amino-anthraquinone in the manner outlined above.

Ring closure of the various intermediate condensation products to the desired vat dye may be effected in a melt of potassium hydroxide containing an alcohol such as methanol or ethanol and maintained at a temperature of from 110–150° C.

The 4 - bromo - 9 - chloromethyl benzanthrone may be obtained by heating 4-bromo benzanthrone dissolved in 96% sulfuric acid with dichlor-dimethyl ether while adding the latter dropwise to the sulfuric acid solution of the 4-bromo benzanthrone. The temperature after the addition is increased to 60° C. and held for 16 hours. A violet-red solution results and this is poured into ice and water from which a bright yellow solid precipitates. The solid is removed by filtration, washed free of acid, and dried.

Suitable 1-amino-anthraquinones which may be utilized for forming the vat dyes hereof are those of the following formula:

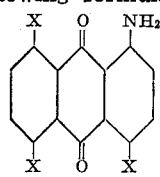

wherein one X is hydrogen, amino, benzoylamino, acetylamino or alkoxy, i. e., methoxy, ethoxy, butyroxy, propoxy, or the like, and the other X's are hydrogen. Examples of such compounds are: 1-amino-anthraquinone, 1.4-diamino-anthraquinone, 1.8-diamino-anthraquinone, 1.5 - diamino-anthraquinone, 1-amino-4-methoxy-anthraquinone, 1 - amino - 4 - ethoxy - anthraquinone, 1-amino-5-methoxy-anthraquinone, 1-amino-8-methoxy-anthraquinone, 1 - amino - 4 - benzoyl-amino-anthraquinone, 1-amino-5-benzoylamino anthraquinone, 1-amino-4-acetylamino-anthraquinone, 1-amino-5-acetylamino-anthraquinone, and the like.

In the event that a 1-amino-acylamino-anthraquinone is used to form the intermediate, the acylamino group is split off during alkali fusion. If it be desired that the vat dye should contain an acylamino group, the product may be acylated with the desired acyl chloride after isolation from the fused reaction mixture.

The vat dyes contemplated herein have the following structure:

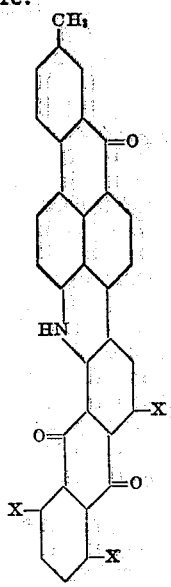

wherein X has the values given above.

Such compounds may be converted into their di-sulfuric acid esters by conventional procedure, i. e., by heating the vat dye in an anhydrous medium comprising pyridine, an addition product of pyridine and sulfur trioxide, iron and cuprous chloride.

The dyeings obtained from the leuco sulfuric acid esters of the involved vat dyes are of a different shade from that obtained from the vats themselves, being shifted in color to a greenish-gray shade. It is recognized in the art that the dyeings obtained from leuco esters of vat dyes where the dyeings are of a shade different from that obtained from the vat dye proper are almost always of very poor fastness properties. Very peculiarly, however, the dyeings obtained with the leuco esters of the present vat dyes have excellent fastness properties, being equal in this respect to the olive dyeings obtained from the vat dyes per se.

The invention is further illustrated by the following examples, but it is to be understood that the invention is not restricted thereto.

*Example I*

A mixture of 30.0 grams of 4-bromo-9-chloromethylbenzanthrone, 17.5 grams of 1-amino-anthraquinone, 15.9 grams of anhydrous sodium carbonate, 1 gram of copper acetate, 5 grams of sodium acetate, and 210 cc. of nitrobenzene are stirred and heated at 205° C. for 4 hours. Nitrobenzene is removed by steam distillation and the violet precipitate is filtered off and dried (weight 39.3 grams).

For preparation of the olive dyestuff, a melt is prepared from 150 grams of potassium hydroxide and 200 cc. of ethanol. To this is added 21 grams of the finely divided condensation product from above. A temperature of 119–125° C. is maintained for 3.5 hours. The black melt is poured into 2 liters of water and the solution of reduced dye is oxidized with air and the precipitated material filtered off and dried (weight 20 grams).

Printing pastes prepared from this dye according to well known methods give smooth strong prints on cotton and viscose rayon possessing excellent fastness properties and of an attractive olive shade.

*Example II*

A solution of 35.8 grams of 4-bromo-9-chloromethylbenzanthrone and 100 grams of aniline is heated at 110–115° C. for 5 hours. By pouring into excess aqueous hydrochloric acid at 30° C., stirring and filtering a quantitative yield of 4-bromo-9-phenylaminomethylbenzanthrone is obtained.

A suspension of 34 grams of the phenylamino condensation product, 18 grams of 1-amino-anthraquinone, 5 grams of anhydrous sodium acetate, 10 grams of calcined soda ash, 1 gram of copper acetate and 200 cc. of nitrobenzene are heated at 205° C. for 4 hours. After steam distillation and filtration, 42.2 grams of dye intermediate were obtained. (Nitrogen calc. 5.0%; found 4.9.)

Ring closure to the dye was performed as in Example I. From 40 grams of starting material 31.5 grams of dye were obtained. The loss in weight corresponds almost exactly to cleavage of the aniline moiety. (Nitrogen calc. 3.1%, found 3.2%).

*Example III*

A solution of 35.8 grams of 4-bromo-9-chloromethylbenzanthrone, 34.2 grams of 1-amino-5-benzoylaminoanthroquinone, 20 grams of calcined soda ash, 15 grams of sodium acetate, 3 grams of copper acetate, and 400 cc. of nitrobenzene are heated for 4.5 hours at 205° C. The condensation product is isolated as in Example I. The yield amounts to 55.5 grams.

For ring closure, a melt is made up from 400 grams of potassium hydroxide and 400 cc. of methanol. To this is added 52 grams of the intermediate condensation product from above. A temperature of 140–142° C. is held for 2 hours and the dye is worked up as in Example I.

From this procedure was obtained 37.5 grams of debenzoylated dyestuff. Benzoylation with benzoyl chloride in nitrobenzene by known methods yields a dyestuff which gave a bright yellowish olive shade, yielding on cotton considerably yellower and brighter shades than the dye of Example I and possessing good fastness properties.

*Example IV*

The procedure is the same as in Example III excepting that the 1-amino-5-benzoylaminoanthraquinone is replaced by 1.5-diamino-anthraquinone. The dyestuff obtained upon benzoylation is the same as that of Example III.

*Example V*

The procedure is the same as in Example I excepting that the 1-amino-anthraquinone is replaced by 1-amino-4-methoxy-anthraquinone. The resulting dye yields grayer shades than the dyes of Example I.

*Example VI*

The procedure is the same as in Example II excepting that the 4-bromo-9-phenylamino methyl benzanthrone is replaced by an equivalent amount of the quaternary ammonium salt of pyridine with 4-bromo-9-chloromethylbenzanthrone. The dyestuff is the same as that of Example II.

The quaternary ammonium salt is prepared as follows: 20 grams of crude 9-chloromethyl-4-bromobenzanthrone and 250 cc. of pyridine are heated on a steam bath at 95° C. for 1.5 hours while stirring. The yellow compound which precipitates is filtered, washed with acetone and dried. The product is soluble in water with a slight greenish fluorescence and is decomposed readily by warming with an aqueous base.

*Example VII*

The procedure is the same as in Example II excepting that the 4-bromo-9-phenylaminomethyl-benzanthrone is replaced by an equivalent quantity of the quaternary ammonium salt obtained as above but while using trimethylamine as the tertiary amine in place of pyridine. The dyestuff is the same as that of Example II.

The same dye is obtained when using the quaternary ammonium salt from dimethyl aniline and 4-bromo-9-chloromethyl benzanthrone.

*Example VIII*

The procedure is the same as in Example I excepting that the 1-amino-anthraquinone is replaced by 1-amino-5-ethoxy-anthraquinone. The dye is similar to that of Example I.

*Example IX*

The procedure is the same as in Example I excepting that the 1-amino-anthraquinone is replaced by 1.8-diamino anthraquinone. Upon benzoylation as in Example III, a product is obtained which yields dyeings similar to those of Example III.

*Example X*

A 500 cc. 3-necked flask equipped with an agitator, thermometer and reflux condenser was charged with 200 cc. of pyridine, dry. The pyridine was cooled to 0° C. and while still cooling, 20 cc. of chlorosulfonic acid was dropped in over a period of 10 minutes. The temperature rose to about 32° C. Crystals of the pyridine and chlorosulfonic acid addition compound separated at this temperature. In order to have a clear solution the temperature was raised to 50° C. At 48° C. 22.5 grams of the product of Example I, 7 grams of iron by hydrogen and .2 gram of cuprous chloride were charged within 6 minutes. During the charging operation the temperature had dropped to 43° C. The air in the reaction flask was replaced by carbon dioxide. While stirring without bath, the temperature went down to 35° C. within 30 minutes. With the aid of a warm water bath of 47° C., the temperature was raised to 46° C. in 8 minutes. The charge was agitated at 46-48° C. for 2 hours. Then 1.4 grams of iron by hydrogen were charged and efficient agitation was continued at 46-48° C. for 2 hours more. The reaction product was poured slowly into a solution of 64 grams of soda ash in 375 cc. of water in a 3-liter 3-necked flask.

Rinsing water was used to get all the material out of the reaction vessel. Finally enough water was added to bring the total volume up to 1200 cc. The 3-necked flask was equipped with a thermometer, a capillary tube and an Eastman condenser in connection with an ordinary condenser. A distillation under diminished pressure was performed using an aspirator and a steam bath. 343 grams of pyridine and water distilled over in this case at 24° C. under 30 mm. pressure during 45 minutes. Since a distinct pyridine odor was observed, 300 cc. of water was added. The vacuum distillation was continued until the pyridine odor had practically disappeared. The content of the flask was filtered and washed with hot water in small amounts until the filtrate was colorless, indicating that all the di-ester was washed out. The remaining iron sludges on the filter were dried. Weight=16.1 gram.

The combined di-sulfuric ester solution and washings had a volume of 1500 cc. In order to have enough alkalinity, 10 cc. of 20% sodium hydroxide solution was added. The di-ester was salted out with sodium chloride at the rate of 25 grams per 100 cc. of solution. In this case 375 grams of sodium chloride were used. The salt was added at 25° C. during 10 minutes. After all the salt had been introduced, the mixture was stirred for 1 hour and then allowed to stand overnight in a dark place without agitation. The filtration was done at 20° C. The di-ester cake was washed with a small amount of washing solution made up of 100 parts of water, 20 parts of sodium chloride and 0.5 part of sodium hydroxide. Finally the cake was sucked down sharply on the Buechner funnel and dried in a vacuum desiccator over calcium chloride.

The dyeings obtained with the disulfuric acid ester are a grayish-green in color, having excellent fastness to washing and light.

I claim:

1. The process of producing vat dyes of the benzanthrone series containing a methyl group in 9-position of the benzanthrone ring which comprises heating in the presence of an alkali a 1-amino-anthraquinone of the following formula:

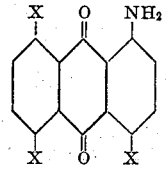

wherein one X is selected from the class consisting of hydrogen, amino, benzoylamino, acetylamino and alkoxy, and the other X's are hydrogen, with a 4 - bromo - 9 - chloromethyl - benzanthrone, and subjecting the resulting condensation product to alkali fusion to effect ring closure thereof.

2. The process of producing a vat dye of the benzanthrone series containing a methyl group in the 9-position thereof which comprises heating in the presence of an alkali 1-amino-anthraquinone with 4 - bromo - 9 - chloromethyl benzanthrone and subjecting the resulting condensation product to an alkali fusion to effect ring closure thereof.

DAVID I. RANDALL.

REFERENCES CITED

The following references are of record in the file of this patent:

UNITED STATES PATENTS

| Number | Name | Date |
|---|---|---|
| 995,936 | Wolff | June 20, 1911 |
| 1,832,236 | Nawiasky | Nov. 17, 1931 |
| 1,845,469 | Wolff et al. | Feb. 16, 1932 |
| 1,936,716 | Honold | Nov. 28, 1933 |
| 1,973,787 | Wolff | Sept. 18, 1934 |
| 2,014,568 | Honold | Sept. 17, 1935 |
| 2,031,058 | Moser et al. | Feb. 18, 1936 |
| 2,212,029 | Lulek | Aug. 20, 1940 |